US012798295B2

(12) United States Patent
Waltz et al.

(10) Patent No.: US 12,798,295 B2
(45) Date of Patent: Nov. 17, 2026

(54) AXLE SYSTEM WITH ISOLATED TRUMPET ARMS AND FEEDTHROUGH FASTENERS

(71) Applicant: Dana Heavy Vehicle Systems Group, LLC, Maumee, OH (US)

(72) Inventors: William F. Waltz, Toledo, OH (US); Michael North, Maumee, OH (US); David Loki, Maumee, OH (US); Gustav Johnson, Canton, MI (US); Daniel D. Carmean, Swanton, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 307 days.

(21) Appl. No.: 18/622,209

(22) Filed: Mar. 29, 2024

(65) Prior Publication Data

US 2025/0303795 A1 Oct. 2, 2025

(51) Int. Cl.

*B60B 35/16* (2006.01)
*B60B 35/12* (2006.01)
*F16H 57/02* (2012.01)

(52) U.S. Cl.

CPC .......... *B60B 35/163* (2013.01); *B60B 35/122* (2013.01); *F16H 57/02* (2013.01); *F16H 2057/02052* (2013.01)

(58) Field of Classification Search

CPC ..... B60B 35/16; B60B 35/163; B60B 35/166; B60B 35/14; B60B 35/122; F16H 57/02; F16H 2057/02052

See application file for complete search history.

(56) References Cited

U.S. PATENT DOCUMENTS 949,229 A * 2/1910 Gruenfeldt .............. F16C 23/04 384/205
1,337,411 A * 4/1920 Richard ................ B60B 35/004 475/230
1,363,882 A * 12/1920 Klocke ................. B60B 35/166 74/607
1,990,344 A * 2/1935 Newhouse ............ B60B 35/163 180/340

(Continued)

FOREIGN PATENT DOCUMENTS

KR 101342666 B1 12/2013

*Primary Examiner* — Thomas C Diaz
(74) *Attorney, Agent, or Firm* — McCoy Russell LLP

(57) ABSTRACT

Described herein is an axle system wherein the attachment locations of trumpet arms are isolated from the side cover side walls and gearbox housing side walls. In one embodiment, the axle system comprises a gearbox housing comprising lateral ribs/webs, compression tubes extending from one side to an opposite side of the gearbox housing, and couple holes positioned around a perimeter of the gearbox housing, a first side cover coupled to the gearbox housing via bolts and fasteners, a first trumpet arm coupled to the first side cover and the gearbox housing via fasteners, an attachment location of the first trumpet arm being isolated from the side walls of the gearbox housing and the side walls of the first side cover, and a second trumpet arm coupled to the gearbox housing via fasteners, the attachment location of the second trumpet arm being isolated from the side walls of the gearbox housing.

20 Claims, 9 Drawing Sheets

(56) References Cited

U.S. PATENT DOCUMENTS

| | | | | |
|---|---|---|---|---|
| 7,628,457 | B2 * | 12/2009 | Pochatila | B60B 35/166 301/124.1 |
| 7,658,262 | B2 * | 2/2010 | Bowers | B60B 35/14 74/606 R |
| 8,302,979 | B2 | 11/2012 | Buschjohann et al. | |
| 8,464,611 | B1 * | 6/2013 | Chandler | B60K 17/165 74/607 |
| 9,388,893 | B1 | 7/2016 | Eckart et al. | |
| 11,247,556 | B2 * | 2/2022 | Kucharski | B60K 17/046 |
| 11,667,191 | B2 | 6/2023 | Kucharski | |
| 2003/0177859 | A1 | 9/2003 | Allmandinger et al. | |

* cited by examiner

AXLE SYSTEM WITH ISOLATED TRUMPET ARMS AND FEEDTHROUGH FASTENERS

TECHNICAL FIELD

The present description relates generally to a trumpet arm configuration for an axle of a vehicle.

BACKGROUND AND SUMMARY

Axle assemblies are adapted to transmit rotational power from a rotational power source of a vehicle to the wheels thereof. Typically, an axle assembly includes a differential assembly that is rotatably supported within a non-rotating central housing. The differential is connected between an input drive shaft extending from the rotational power source/transmission and a pair of output axle shafts extending to the vehicle wheels. The axle shafts are contained in respective non-rotating beam housing portions, which are secured to the central housing. Thus, rotation of the differential by the drive shaft causes corresponding rotation of the axle shafts. The central housing and the beam housing portions form an axle housing for these drive train components of the axle assembly, with the differential and the axle shafts supported for rotation therein.

One type of axle housing includes a unitized central housing construction, commonly referred to as a Salisbury axle assembly. Another type of axle housing, referred to as a banjo type axle housing includes a central housing construction which is continuous with two arm portions, where each of the arm portions form a smooth, gradual, flared connection with the central housing. As electric vehicles move towards the use of electric axles, traditional banjo and Salisbury axles with their streamlined housings may not provide enough room to package all of the components demanded for an electric axle, such as one or more electric machines, gears, shafts, bearings, shift actuators, differentials, pumps, heat exchangers, filters, sensors, and so on. Electric machines may refer to electric motors and electric motor generators.

Thus, there is demand for an axle which provides a desirable amount and shape of space in which to package the electric axle components. A potential solution is an axle with a gearbox housing having relatively flat sides and two trumpet arms extending along an output axle axis. This may help achieve the packaging space demanded to fit the electric axle components. However, challenges arise where the flange of a trumpet arm meets the side walls of the gearbox housing and/or a face of a side cover bolted to the gearbox housing, where the trumpet arm flange is used to bolt the trumpet arm to the gearbox housing or side cover. The trumpet flange/arm transition is a high-stress region that is vulnerable to deflection from road loads, which may lead to the gearbox housing and/or the side cover fatiguing.

Another problem that may arise from deflection of a side cover along its bolted flange includes the side cover flange seals breaking and causing leaks. The region within the trumpet flange/arm transition houses bearings along the output axis that support the differential and bearings that support other rotational components. Moreover, the side walls and side covers of the gearbox housing contain pockets for upstream power path support bearings that support rotation of reduction gearing that is parallel to the output axis. As such if the trumpet arms are integral with the side covers or main housing, deflections from road loads are transferred through the trumpet arm to the gearbox side walls or side cover walls. Deflections of the gearbox side walls or side cover walls may cause skew misalignment between the bearings that the respective gearbox side walls or side cover walls are supporting, which may reduce bearing life and gear life and increase noise, vibration, and harshness. As a result of side wall deflections and side cover seal leaks and deflections, there arises a demand to isolate the trumpet arms from the side walls and side covers. This is accomplished by having separate trumpet arms that bolt to the gearbox perimeter allowing the side walls and side covers to react to internal loads and be isolated from the external trumpet arm interactions with road loads. When isolated, the side walls and side covers are no longer part of the external path from the road load to the gearbox housing.

Described herein is an axle system comprising a gearbox housing comprising lateral ribs/webs, compression tubes extending from one side to an opposite side of the gearbox housing, and couple holes positioned around a perimeter of the gearbox housing, a first side cover coupled to the gearbox housing via bolts and via fasteners extending through couple holes positioned on a side of the first side cover, a first trumpet arm coupled to the first side cover and the gearbox housing via fasteners extending through couple holes positioned around the perimeter of the flange of the first trumpet arm and the gearbox housing, the attachment location of the first trumpet arm consequently being isolated from the side walls of the gearbox housing and the side walls of the first side cover, a second side cover coupled to the gearbox housing via bolts, and a second trumpet arm coupled to the gearbox housing via fasteners extending through couple holes positioned around the perimeter of the flange of the second trumpet arm and the gearbox housing, the attachment location of the second trumpet arm consequently being isolated from the side walls of the gearbox housing and the side walls of the second side cover.

The first side cover may be located between the gearbox housing and the first trumpet arm. The second side cover may be located between the gearbox housing and the second trumpet arm, and the side walls of the second side cover may be isolated from the second trumpet arm. By isolating the first trumpet arm and the second trumpet arm from the side walls of the side covers and the side walls of the gearbox housing, effects of deflections from road loads transferred through the trumpet arms to the gearbox housing on the side walls and side covers are reduced as the deflections are transferred first between the first trumpet arm and the second trumpet arm to the gearbox housing via the fasteners.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems for an axle that includes a trumpet arm with an attachment location that is isolated from the side walls of the gearbox housing and the side walls of the side covers of a gearbox housing. The attachment location is isolated by integrating fasteners, such as tension rods, through bolts, or bolts (e.g. long bolts with variable lengths), that extend through couple holes positioned around the perimeter of the flange of a first trumpet arm on one side of the axle, through couple holes in the side of the first side cover, through couple holes positioned around the perimeter of the gearbox housing, and through couple holes positioned around the perimeter of the flange of a second trumpet arm. The fasteners may extend through internal lateral webs/ribs, external lateral web/ribs, internal compression tubes, and external compression tubes of the gearbox housing. Oscillations of the fasteners may be dampened by flexible elements surrounding a portion of the fasteners. By isolating the attachment location, reaction forces due to deflections from road load may be transferred from the first trumpet arm through the gearbox housing to the second trumpet arm. The fasteners may be in a tensile state via nuts to compress the gearbox housing to increase the strength of the axle. In this way, the trumpet arm arrangement described herein provides a geometry which enables mounting of electric machine components and suspension packages on an axle, while also providing strength and rigidity which may protect against degradation of the side walls of the gearbox housing, the side walls of the side covers, and gears and bearings included in a gearbox assembly enclosed within the gearbox housing.

Figure 1:
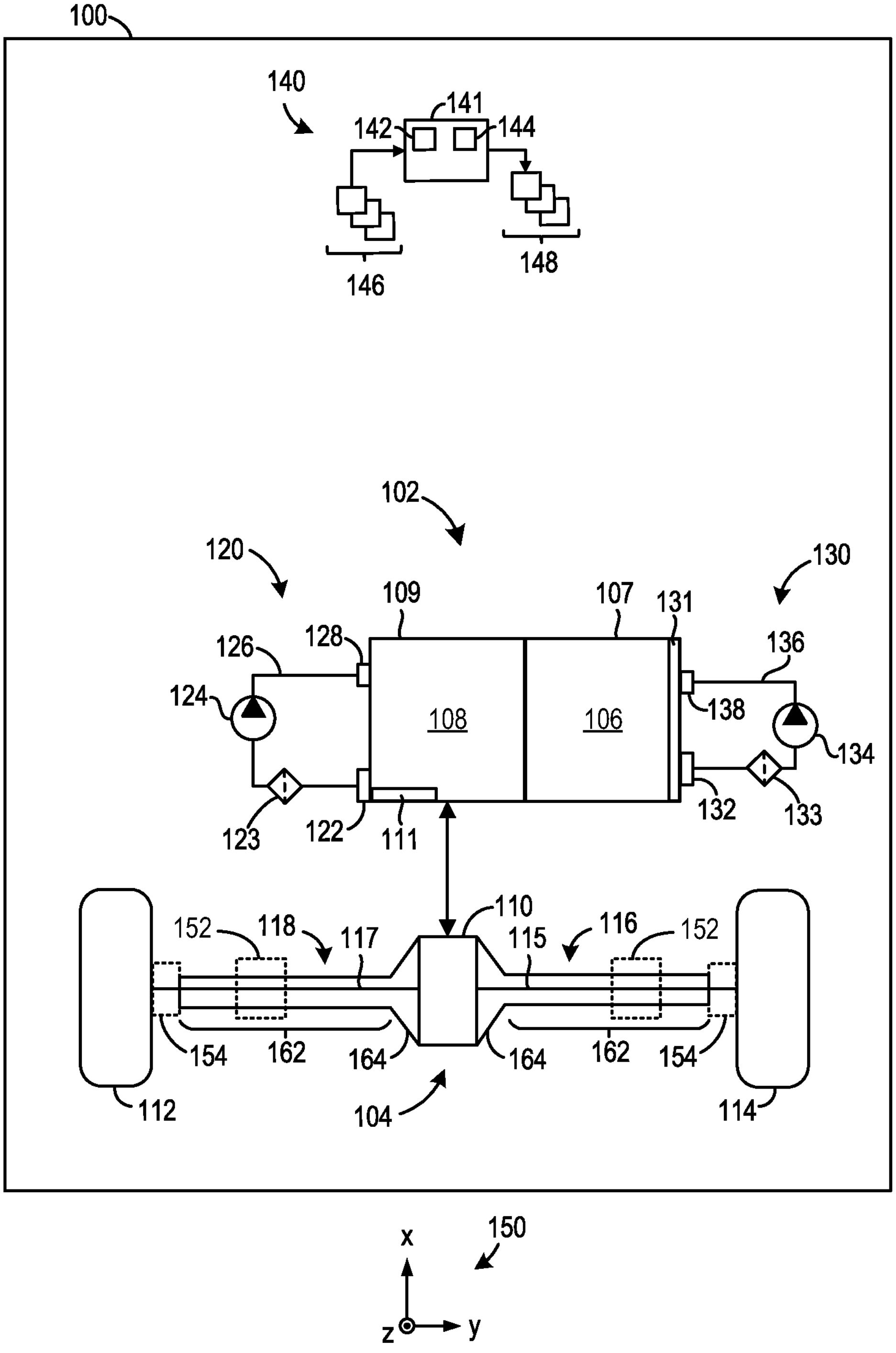
FIG. 1 shows a schematic representation of an electric drive system with trumpet arms.
Figure 2A:
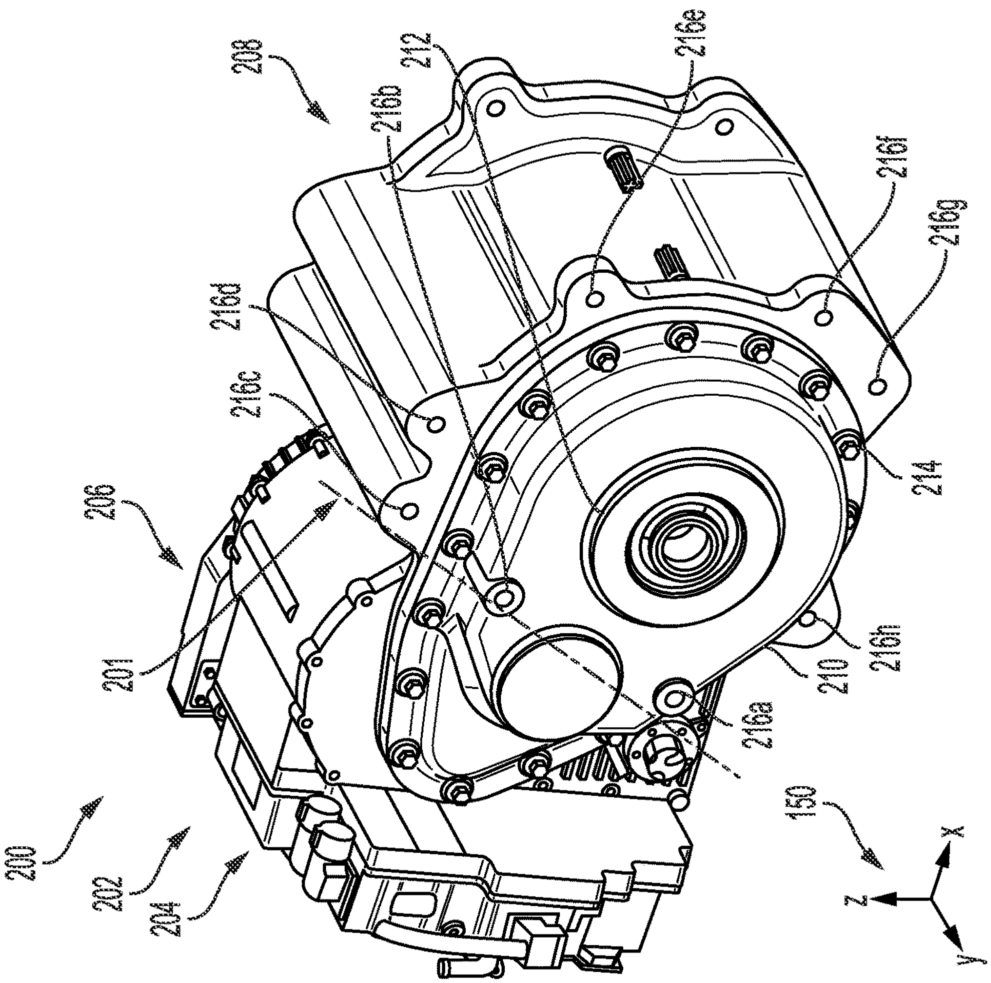
FIG. 2A shows a side view of an electric drive system, according to one example, wherein two trumpet arms are not assembled.
Figure 2B:
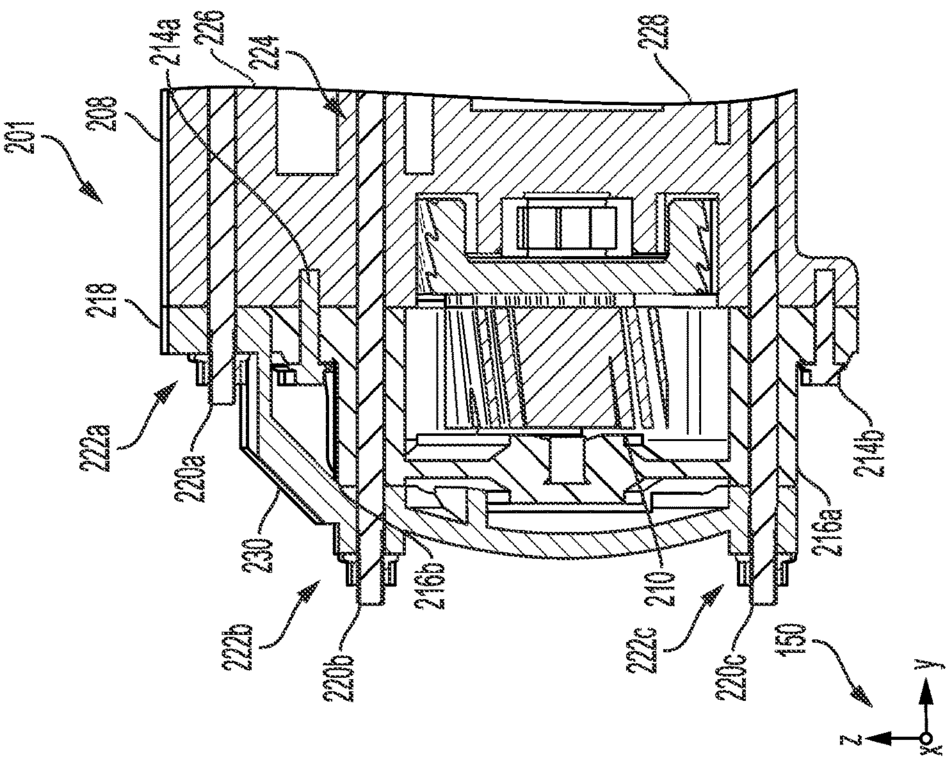
FIG. 2B shows a cross section view of the electric drive system of FIG. 2A.
Figure 3:
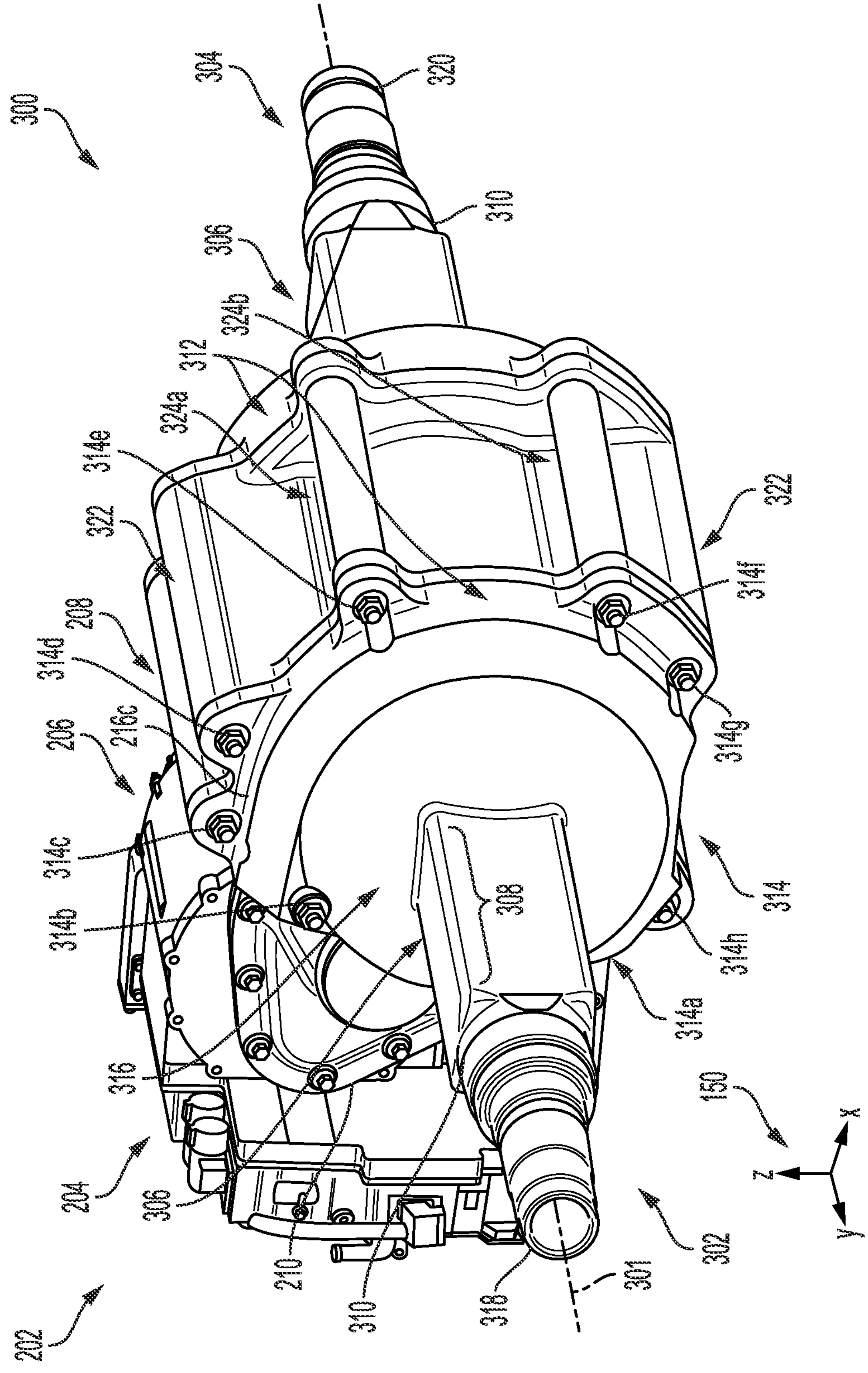
FIG. 3 shows a side view of an electric drive system, according to one example, which includes two trumpet arms.
Figure 4:
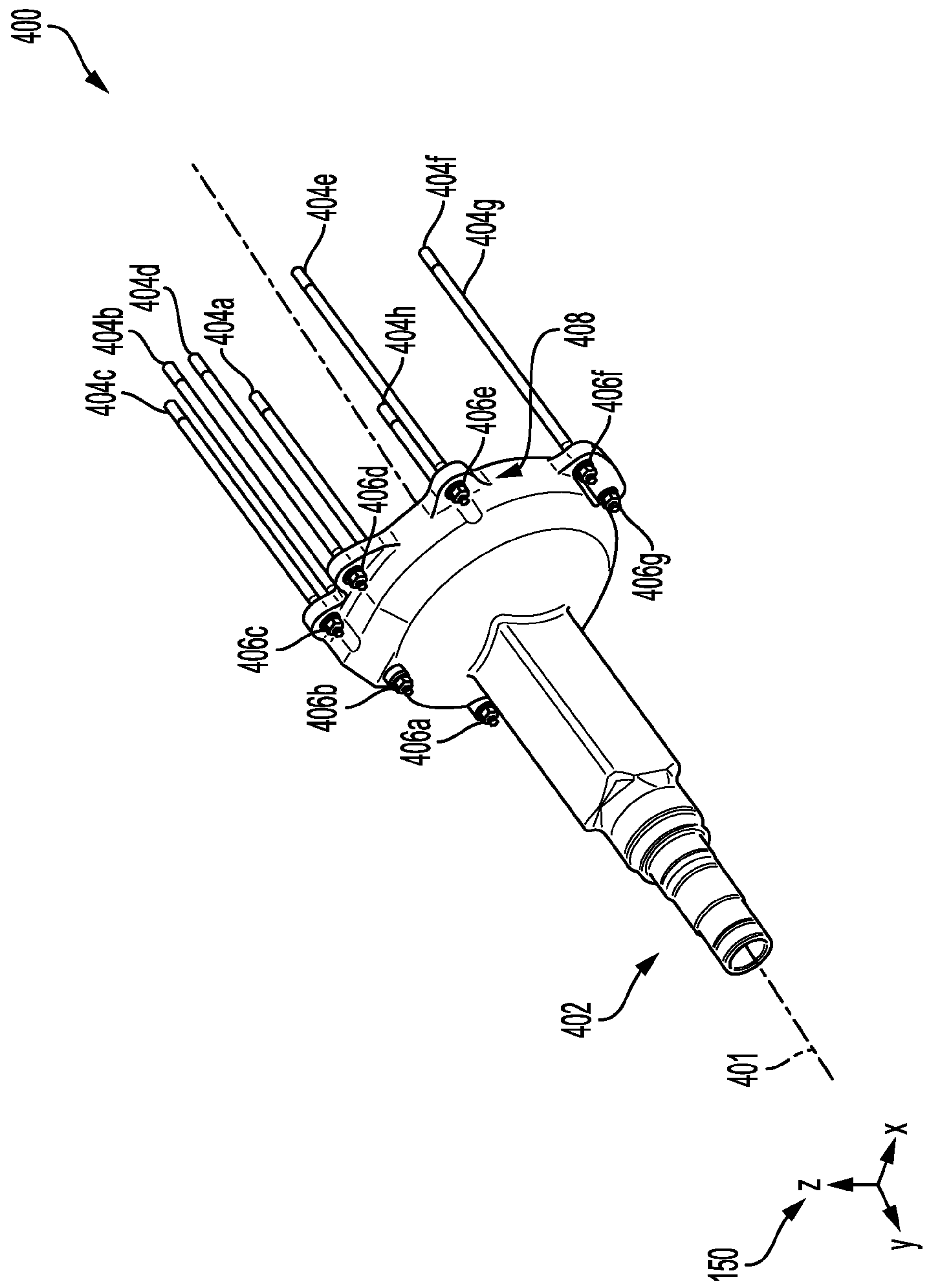
FIG. 4 shows a side view of a trumpet arm.

FIG. 1 schematically depicts an electric drive system in a vehicle with at least one trumpet arm used for an axle of the electric drive system, where the electric drive system is configured as described herein. FIG. 2A shows a view of an electric drive system (e.g., of FIG. 1) wherein a first trumpet arm and a second trumpet arm are not assembled and thus, coupled to a gearbox housing. FIG. 2B shows a partial cross sectional view of an electric drive system (e.g., of FIG. 2A) with a section of a first trumpet arm. FIG. 3 shows a view of an electric drive system wherein a first trumpet arm and a second trumpet arm are positioned to form a space wherein a gearbox housing may be positioned and coupled to each of the first trumpet arm and the second trumpet arm. FIG. 4 shows a side view of a trumpet arm which may be included in the systems of FIG. 1-3. FIG. 5-8 shows different side and cross section views of an electric drive system which may be different embodiments of the systems of FIGS. 1-3 with additional components, such as internal compression tubes, external compression tubes, and dampening components, which may surround a fastener. FIGS. 9A and 9B show side views of a first side cover, which may be included in the electric drive system of FIGS. 1-3.

FIG. 1 schematically illustrates a vehicle 100 with an electric drive system 102 that provides power to and/or is incorporated into an axle assembly 104 of vehicle 100. The vehicle 100 may take a variety of forms in different examples, such as a light, medium, or heavy duty vehicle. Additionally, the electric drive system 102 may be adapted for use in front and/or rear axles, as well as steerable and non-steerable axles. To generate power, the electric drive system 102 may include an electric machine 106. In some examples, the electric machine 106 may be an electric motor-generator and may thus include conventional components such as a rotor, a stator, and the like housed within an electric machine housing 107 for generating mechanical power as well as electric power during a regenerative mode, in some cases. In additional examples the electric machine 106 may be replaced with a prime mover, such as an internal combustion engine (ICE). Further, in other examples, the vehicle 100 may include an additional motive power source, such as an internal combustion engine (ICE) (e.g., a spark and/or compression ignition engine), for providing power to another axle. As such, the electric drive system 102 may be utilized in an internal combustion engine (ICE) vehicle or an electric vehicle (EV), such as a hybrid electric vehicle (HEV) or a battery electric vehicle (BEV), including cars, trucks, boats, ATVs, commercial vehicles, light vehicles, off-highway vehicle, mining vehicles, rail vehicles, manufacturing machinery, industrial machinery, and the like.

In some examples, the electric machine housing 107 may be coupled (e.g., via bolts) to a gearbox housing 109 of a gearbox 108. Further, the electric machine 106 may provide mechanical power to a differential 110 via the gearbox 108. From the differential 110, mechanical power may be transferred to a first drive wheel 112 and a second drive wheel 114 by way of axle shaft 117 and axle shaft 115, respectively, of the axle assembly 104. As such, the differential 110 may distribute torque, received from the electric machine 106 via the gearbox 108, to the first drive wheel 112 of the axle shaft 117 and to the second drive wheel 114 of the axle shaft 115 during certain operating conditions. In some examples, the differential 110 may be an open differential, a locking differential, an active or passive limited slip differential, or a torque vectoring differential.

One or both of the axle shaft 117 and axle shaft 115 may be housed in a trumpet arm, as further described herein. For example, axle shaft 117 is housed in a first trumpet arm 118, and axle shaft 115 is housed in a second trumpet arm 116. Each of the first trumpet arm 118 and the second trumpet arm 116 may be coupled to the differential 110 at a respective planar face of the flange.

In some embodiments, axle assembly 104 includes additional elements which are coupled to, mounted on, or otherwise joined with at least one of the first trumpet arm 118 and the second trumpet arm 116. For example, a suspension package 152 may be mounted on both of the first trumpet arm 118 and the second trumpet arm 116 along the respective arm section 162. In some embodiments, a spindle 154 may be coupled to the outlet of each of the first trumpet arm 118 and the second trumpet arm 116. For example, a first spindle end of the spindle 154 may be coupled to the respective trumpet arm, and drive wheels (e.g., the first drive wheel 112 or the second drive wheel 114) may be coupled to each of the first spindle and the second spindle at a second spindle end of the respective spindle, opposite the first spindle end of the spindle.

As further described herein, one or more of the first trumpet arm 118 and the second trumpet arm 116 may also include a differential lock/axle disconnect assembly positioned in a body of the flange 164. The differential lock/axle disconnect assembly may be configured to selectively mate with a mating clutch of the differential 110 and/or the gearbox 108, respectively.

The gearbox 108 may be a single-speed gearbox, where the gearbox 108 operates in one gear ratio. However, other gearbox arrangements have been envisioned such as a multi-speed gearbox that is designed to operate in multiple distinct gear ratios. In one example, the gearbox 108 and the differential 110 may be incorporated into the axle assembly 104, forming an axle in the vehicle 100. Further, in another example, the electric machine 106, the gearbox 108, and the differential 110 may be incorporated into the axle assembly 104, forming an electric axle (e-axle) in the vehicle 100. The e-axle, among other functions, provides motive power to the first drive wheel 112 and the second drive wheel 114 during operation. Specifically, in the e-axle embodiment, the electric machine 106 and gearbox 108 may be coupled to and/or otherwise support the first trumpet arm 118 and the second trumpet arm 116. Both the e-axle and the axle embodiments may provide a compact arrangement for delivering power directly to the axle assembly 104. For example, the first trumpet arm 118 may be coupled to a first side of the gearbox housing 109 and the second trumpet arm 116 may be coupled to a second side of gearbox housing 109, opposite the first side, as further described with respect to FIGS. 2A-3.

The electric drive system 102 may further include a lubricant circuit 120 for circulating lubricant through the gearbox housing 109 to lubricate and/or cool various system components. The lubricant circuit 120 may be an oil circuit for circulating oil (e.g., natural and/or synthetic oil) through the gearbox housing 109 to lubricate and/or cool various system components wherein the lubricant is oil. The lubricant circuit 120 may include a filter 123 and an oil pump 124 that draws oil from an oil reservoir 111 (e.g., a sump) in the gearbox housing 109, via an outlet 122, and drives a pressurized oil flow through a delivery line 126 to an inlet 128 of the gearbox housing 109. In some examples, the oil pump 124 may be provided at an exterior portion of the gearbox housing 109. However, in other examples, the oil pump may be included within the gearbox housing 109. Various distribution components and arrangements (e.g., nozzles, valves, jets, oil passages, and the like) of the lubricant circuit 120 may be included within the electric drive system 102 in order to facilitate routing of the lubricant (e.g., oil) within the gearbox housing 109 and, in one particular example, to a portion of the electric machine housing 107. In some cases, the lubricant circuit 120 may be used for routing lubricant to various gearbox bearings and gears as well as the motor stator, motor rotor, and rotor shaft bearings of the electric machine 106, thereby providing an efficient system for effectively using the gearbox lubricant to cool said systems. In some embodiments, the lubricant circuit 120 may further include a heat exchanger or radiator, which may remove heat (e.g., thermal energy) from the lubricant (e.g., glycol) that exits the gearbox housing 109 by way of the outlet 122.

The electric drive system 102 may further include a coolant circuit 130 that circulates coolant (e.g., water, glycol, and/or oil) through coolant passages 131 formed in the electric machine 106, electric machine housing 107, or an inverter. The coolant circuit 130 may include a coolant inlet 138 and a coolant outlet 132 positioned on (or in) the electric machine housing 107. The coolant circuit 130 may further include a filter 133 and a pump 134 that circulates coolant from the coolant outlet 132 to the coolant inlet 138 via a coolant delivery line 136. From the coolant inlet 138, the coolant travels into the coolant passages 131 formed in the electric machine 106, the electric machine housing 107, or an inverter, which removes heat from the components. In some examples, the coolant circuit 130 may further include a heat exchanger (e.g., radiator) which may remove heat from the coolant that exits the coolant circuit by way of the coolant outlet 132.

The vehicle 100 may also include a control system 140 with a controller 141. The controller 141 may include a processor 142 and a memory 144. The memory may hold instructions stored therein that when executed by the processor cause the controller 141 to perform various methods, control techniques, and the like. The processor 142 may include a microprocessor unit and/or other types of circuits. The memory 144 may include known data storage mediums such as random access memory, read only memory, keep alive memory, combinations thereof, and the like. The controller 141 may receive various signals from sensors 146 positioned in different locations in the vehicle 100 and electric drive system 102. The controller 141 may also send control signals to various actuators 148 coupled at different locations in the vehicle 100 and electric drive system 102. For instance, the controller 141 may send command signals to the oil pump 124 and/or the pump 134 and, in response, the actuator(s) in the pump(s) may be adjusted to alter the flowrate of the oil and/or coolant delivered therefrom. In other examples, the controller may receive a change in throttle position command as requested by the operator via a change in foot position on the throttle pedal. The controller may send control signals to the electric machine 106, and in response to receiving the command signals, the electric machine may be adjusted to alter a rotor speed or torque. The other controllable components in the system may be operated in a similar manner with regard to sensor signals and actuator adjustment.

An axis system 150 is provided in FIG. 1. The z-axis may be a vertical axis (e.g., parallel to a gravitational axis), the x-axis may be a longitudinal axis (e.g., horizontal axis), and/or the y-axis may be a lateral axis, in one example. However, the axes may have other orientations, in other examples. When referencing direction, positive may refer to the direction of the arrow of the y-axis, x-axis, and z-axis and negative may refer to the opposite direction of the arrow of the y-axis, x-axis, and z-axis. A filled circle may represent an arrow and axis facing toward, or positive to, a view. An unfilled circle may represent an arrow and an axis facing away, or negative to, a view.

FIG. 2A depicts an example electric drive system 200 with electric axle components for providing power to an axle assembly 202. The electric axle components of the electric drive system 200 may include an electric machine 206 electrically coupled to an inverter 204 and operatively coupled to a gearbox housing 208, and may be included in a vehicle, such as the vehicle 100 depicted in FIG. 1. The electric drive system 200 may thus share similarities with the electric drive system 102. For instance, at least a portion of the components discussed with regard to the electric drive system 102, shown in FIG. 1, may be included in the electric drive system 200, shown in FIG. 2A, or vice versa. A cross section 201 may be taken on a dashed line in FIG. 2A. The cross section 201 may be taken on a plane formed between the dashed line and an axis parallel with the y axis of the reference axes.

The electric drive system 200 may further include a first side cover 210 coupled to the gearbox housing 208 via fasteners 214. The fasteners 214 may be bolts. The first side cover 210 has multiple couple holes, including a first couple hole 216*a* and a second couple hole 216*b*, positioned on a side of the first side cover, which are configured to have fastening attachments, such as threaded tension rods, through bolts, or bolts (e.g., long bolts), pass through the first side cover 210 to couple the first trumpet arm (not shown) to electric axle components, such as the gearbox housing 208. The first couple hole 216*a* and the second couple hole 216*b* positioned on the side of the first side cover may be positioned at locations where the first side cover 210 is able to be supported by a boss or junction on the interior side of the first side cover 210. The boss or junction on the interior side of the first side cover may be integral with the first side cover 210, an extension of an internal lateral rib/web or an external lateral rib/web of the gearbox housing 208. The boss or junction between the first side cover 210 and the gearbox housing 208 may be sealed with an O-ring, gasket, sealant, compression washer, a combination, and the like.

FIG. 2B, depicts the cross section 201 of the electric drive system 200. Multiple couple holes are positioned at various points on the side of the first side cover 210. In one example, the first side cover 210 may include a first couple hole 216*a* and a second couple hole 216*b*. Similarly, the gearbox housing 208 has corresponding couple holes. Furthermore, the gearbox housing 208 may have multiple couple holes positioned around a perimeter of the gearbox housing 208. For example, the gearbox housing 208 may include a third couple hole 216*c*, a fourth couple hole 216*d*, a fifth couple hole 216*e*, a sixth couple hole 216*f*, a seventh couple hole 216*g*, and an eighth couple hole 216*h*.

In some embodiments, each of the multiple couple holes on the side of the first side cover 210 may have a raised bolt pad, which may assist in positioning a fastening attachment, such as a threaded tension rod or bolt (e.g., long bolt), and distributed bolt loading. The raised bolt pad may further aid in manufacturing of the first side cover 210. In some embodiments, the raised pads may or may not be used. For example, a spot face may be used instead. Each of the multiple couple holes may be strategically positioned on the first side cover 210 and around the perimeter of the gearbox housing 208 to enable alignment of each through couple hole of the first and second trumpet arms (not shown) with a coupling hole of each of the first side cover 210 and the gearbox housing 208. The first side cover 210 may further include a bearing 212 that couples a fifth shaft to the first side cover 210. The first side cover 210 may have an output seal that engages a first axle shaft, furthermore a second side cover (not shown) may have an output seal that engages a second axle shaft, where both output seals retain oil in the gearbox housing, which allows the trumpet arms (not shown) to run dry. Since oil is not supplied to wheel end bearings for lubrication (e.g., due to more efficiently sealed wheel end bearings) and oil is retained in the gearbox housing 208, the resulting reduction in the amount of oil used in the electric drive system 200 may reduce weight and cost of the electric drive system 200.

The electric machine 206 may provide power to a differential (not shown) via the gearbox housing 208 to provide rotational power to the first axle shaft and the second axle shaft (to which drive wheels may be coupled) of the axle assembly 202. The first axle shaft and the second axle shaft are not shown in FIG. 2A, and are to be understood as being at least partially enclosed within the housing of both trumpet arms (not shown), respectively.

Turning to FIG. 2B, the cross section 201 of the electric drive system 200 is shown, including the gearbox housing 208 and the first side cover 210. Elements of the gearbox housing 208 and first side cover 210 may not be reintroduced, for brevity. The cross section 201 shows an interior of the electric drive system 200 when dividing the electric drive system by a line that extends from the first couple hole 216*a* to the second couple hole 216*b*. As shown, the first side cover 210 is coupled to the gearbox housing 208 via bolts 214. In particular, the first side cover 210 may be coupled to the gearbox housing 208 via a first bolt 214*a* and a second bolt 214*b*, amongst others.

The cross section 201 of the electric drive system 200 includes a first trumpet arm flange 218 that is integral with first trumpet arm 230, and that is coupled to the gearbox housing 208 via a first fastener 220*a* and a first nut 222*a*. The fasteners extend from the first trumpet arm flange 218 of the first trumpet arm on one side of the electric drive system 200 to the flange of a second trumpet arm (not shown) on an opposite side of the electric drive system. More specifically, the fasteners extend through couple holes, the couple holes being located around the perimeter of the flange (e.g., the first trumpet arm flange 218) of the first trumpet arm 230, to couple holes of the gearbox housing 208 into lateral ribs/webs of the gearbox housing 208, to couple holes in the flange on the second trumpet arm (not shown). The lateral ribs/webs of the gearbox housing 208 may be internal lateral ribs/webs 224, or external lateral ribs/webs 226 and external lateral ribs/webs 228. The lateral ribs/webs may be positioned on a peripheral of the gearbox housing 208. The internal lateral ribs/webs, the external lateral ribs/webs, and the trumpet arms (e.g., a first trumpet arm 230 and a second trumpet arm) are parallel to the axle axis. Cross section 201 further includes the first trumpet arm 230 that is coupled to the first side cover 210 and the gearbox housing 208 via fasteners and nuts. The fasteners extend through couple holes of the first trumpet arm 230, to couple holes of the first side cover 210 and gearbox housing 208 into lateral ribs/webs of the gearbox housing 208, to couple holes in the flange on the second trumpet arm (not shown).

The fasteners may include a first fastener 220*a*, a second fastener 220*b*, and a third fastener 220*c*, as an example. The first fastener 220*a* extends from the first trumpet arm flange 218 of the first trumpet arm 230 located on one side of the electric drive system into the gearbox housing 208 to the flange of the second trumpet arm (not shown) located on the other side of the electric drive system via the respective couple holes. Each of the second fastener 220*b* and the third fastener 220*c* extends from the first trumpet arm 230 located on one side of the electric drive system into the first side cover 210 and the gearbox housing 208 to the flange of the second trumpet arm (not shown) located on the other side of the electric drive system via the respective couple holes.

Two nuts are coupled to each of the fasteners on each side of the respective fastener, such that one nut is coupled to a fastener on one side of the electric drive system 200 and another nut (not shown) is coupled to the fastener on the other side of the electric drive system 200. For example, a first nut 222*a* is coupled to the first fastener 220*a*, a second nut 222*b* is coupled to the second fastener 220*b*, and a third nut 222*c* is coupled to the third fastener 220*c*. Although not shown, each of the first fastener 220*a*, the second fastener 220*b*, and the third fastener 220*c* is coupled to another nut. In this way, the fasteners are in a tensile state via nuts to enable the center region of the gearbox housing 208 to be placed in compression, which in turn, strengthens the gearbox housing 208. By employing fasteners that extend from one side to another side of the electric drive system 200 to couple the first trumpet arm 230, the first side cover 210, the gearbox housing 208, a second side cover (not shown), and the second trumpet arm, forces may be transferred from the first trumpet arm to the second trumpet arm while isolating the side covers and side walls of the gearbox housing 208.

In embodiments wherein the fasteners are bolts (e.g., long bolts), a periphery of the gearbox housing 208 and/or the internal lateral ribs/webs and/or the external lateral ribs/webs of the gearbox housing 208 may be drilled deep and threaded near the mid-region of the internal lateral rib/webs and/or the external lateral rib/webs to enable an unthreaded length of the bolt to be at least five times longer than the bolt diameter. In other words, the internal lateral rib/webs and the external lateral rib/webs may be drilled and tapped such that the full drill shoulder depth of the drilled lateral rib/web is equal to or greater than five times the diameter of the drilled lateral rib/web hole. Additionally, for compression tubes (not shown) with co-linear couple holes, the compression tubes may also be drilled and tapped such that the full drill shoulder depth of the compression tube is equal to or greater than five times the diameter of the drilled compression tube hole, and wherein the compression tubes are threaded near a mid-region of the compression tubes. The bolts may either be partially threaded or fully threaded, and opposing couple holes of the trumpet arms may be co-linear or offset in the internal lateral ribs/webs 224 and/or external lateral ribs/webs of the gearbox housing 208.

In embodiments wherein the fasteners are tension rods, or a through bolt with a nut, the periphery of the gearbox housing 208 and/or the external lateral ribs/webs, the internal lateral ribs/webs and/or the compression tubes are not threaded in the mid-region of the external lateral ribs/webs, internal lateral ribs/webs, and compression tubes. Further, the opposing trumpet arm flange holes extending from one side of the gearbox to another side of the gearbox may be coaxial (e.g., co-linear) to align with a through hole in the gearbox housing 208. Tension rods and/or long through bolts may either be partially threaded or fully threaded. Partially threaded tension rods with the threads rolled on both ends may have manufacturing and economic advantages over fully threaded rods or through bolts. Manufacturing through holes in the gearbox housing 208 may also have economic advantages over drilling and taping holes for bolts (e.g., long bolts). For instance, drilling a through hole in the gearbox can be accomplished from one side in one machining operation (drilling of the through hole), whereas drilling and tapping holes for the bolts involves machining from two sides of the gearbox and a tool change for each hole (e.g., for the drill and the tap). Therefore, drilling a single through hole may save cycle time by reducing tool travel and eliminating a tool change, and reduce cost by eliminating the use of a tap, when compared to drilling and taping holes for bolts. As an alternative to a nut for the through bolts, one trumpet arm may have tapped flange holes that the threaded end of the through bolts may screw into, eliminating the demand for the nut.

Both bolts (e.g., long bolts), tension rods, and through bolts allow for a longer tension member (e.g., a long bolt or a threaded rod) with a high preload that increases fatigue resistance of the bolted connection and the thread locking affect. Additionally, the bolts, the tension rods, and the through bolts move the thread stress away from the sides of the gearbox housing 208, which decreases thread fatigue and gearbox side wall fracture. Further, the gearbox housing 208 is strengthened and more ridged due to the gearbox housing 208 being in compression when either bolts, tension rods or through bolts are integrated into the electric drive system 200. When the mid-region of the gearbox housing 208 is threaded for the bolts, and more specifically, for long bolts, each half of the gearbox housing 208 is put in compression, whereas for the tension rods and through bolts the entire width of the gearbox housing 208 is put in compression.

With gearbox housing 208 being in compression and thread stress at the gearbox housing flange reduced or nearly eliminated, the gearbox housing 208 may be fabricated from aluminum or another lightweight alloy instead of an iron alloy. When tension rods are used instead of bolts (e.g., long bolts), the exclusion of the threaded mid-region of the gearbox housing 208 enables stresses induced from the trumpet arms to be more evenly distributed throughout the gearbox housing 208 due to the absence of a localized reaction from threads located in the mid-region of the internal lateral ribs/webs 224 and the external lateral ribs/webs. Further, the tension rods transmit reaction forces directly from the first trumpet arm to the second trumpet arm with the gearbox acting as a spacer. By putting the gearbox housing 208 in compression, the bolts and tension rods may dampen vibration of the electric drive system 200 as well.

FIG. 3 shows an example electric drive system 300 with isolated trumpet arms, which may be an embodiment of the electric drive system 200 depicted in FIG. 2A. Elements of the axle assembly 202, such as the inverter 204, the electric machine 206, the gearbox housing 208, and the first side cover 210 may not be reintroduced, for brevity. The electric drive system 300 may have an axis 301. The axis may be a longitudinal axis for the axle assembly 202 (e.g., the axis may be an axle axis). The axis 301 may be a rotational axis for components of the electric drive system 300 and the axle assembly 202. The axle assembly 202 includes a first trumpet arm 302 and a second trumpet arm 304, both of which are examples of a trumpet arm comprising a housing 306 with an arm section 308 extending an arm length, the arm section 308 having an outlet at a first end 310, and a flange 312 with a planar face at a second end opposite the first end. The first trumpet arm 302 and the second trumpet arm 304 may be centered around the axis 301 such that the first trumpet arm 302 and the second trumpet arm 304 have their respective centerlines coaxial with the axis 301. An attachment location of the first trumpet arm 302 may be isolated from the sides of the gearbox housing and the first side cover 210. The attachment location of the second trumpet arm 304 may be isolated from the sides of the gearbox housing and the second side cover (not shown). The attachment locations of each of the first trumpet arm 302 and the second trumpet arm 304 may be isolated from the sides of the gearbox housing 208, first side cover 210, and second side cover (not shown) via fasteners that extend around the perimeter of the flange 312 of the trumpet arms and the gearbox housing, the attachment location of the trumpet arms consequently being isolated from the side walls of the gearbox housing, the side walls of the first side cover, and the side walls of the second side cover.

The curved extension 316 of the flange of both the first trumpet arm 302 and the second trumpet arm 304 may assist in providing a substantially sized envelope in which to package electric axle components. For example, the planar face of the flange 312 enables positioning of electric axle components, such as the electric machine 206, the gearbox housing 208, gearing and/or a differential (not shown in FIG. 2A) in the axle assembly 202 while achieving a desired strength and rigidity of the axle assembly 202 which distributes a road load and reduce stresses on the trumpet arms.

As further described herein, the flange 312 of each of the first trumpet arm 302 and the second trumpet arm 304 includes multiple through holes around a perimeter of the flange 312 at the planar face. Fasteners 314 may extend through each of the multiple through holes and couple the first trumpet arm 302 and the second trumpet arm 304 to the gearbox housing 208. For example, a first fastener 314*a*, a second fastener 314*b*, a third fastener 314*c*, a fourth fastener 314*d*, a fifth fastener 314*c*, a sixth fastener 314*f*, a seventh fastener 314*g*, and an eight fastener 314*h* may extend through a respective through hole of the flange 312 to couple the first trumpet arm 302 and the second trumpet arm 304 to the gearbox housing 208. Each of the first trumpet arm 302, the second trumpet arm 304, and the gearbox housing 208 may be made of a metal (e.g., aluminum, steel, iron, combinations thereof, and the like), where the first trumpet arm 302 and the second trumpet arm 304 may be the same or a different metal than the gearbox housing 208.

In some embodiments, each of the first trumpet arm 302 and the second trumpet arm 304 have a spindle coupled to the housing 306 at the outlet of the arm section 308. For example, a first spindle 318 is coupled to the first trumpet arm 302 and a second spindle 320 is coupled to the second trumpet arm 304 at the first end 310 of each trumpet arm. A drive wheel may be mounted on each of the first spindle 318 and the second spindle 320, and the first axle shaft and the second axle shaft may extend through each of the first spindle 318 and the second spindle 320, respectively, to drive rotation of the respective drive wheel. The first axle shaft and the second axle shaft are the first axle shaft and the second axle shaft described therein above for FIG. 2.

The gearbox housing 208 may further include external lateral ribs/webs 322. As referenced in FIG. 3, the external lateral ribs/webs 322 structurally support clamping of the first trumpet arm 302, the second trumpet arm 304, gearbox housing 208, the first side cover 210, and optionally, a second side cover (not shown), to enable the aforementioned gearbox housing 208 to be compressed. The gearbox housing 208 may further include compression tubes, including a first compression tube 324*a* and a second compression tube 324*b*. The compression tubes also structurally support clamping of the gearbox housing 208 and enable the gearbox housing 208 to be compressed. The gearbox housing 208 may be configured with compression tubes in lieu of lateral ribs/webs at locations to enable assembly, reduce weight, or to also use the compression tubes as mounting brackets and/or supports. Although not shown, O-rings, gaskets, or sealant may surround the ends of the compression tubes to enable sealing and prevent modal vibration.

FIG. 4 shows a side view 400 of a trumpet arm 402 which enables partial visualization of fasteners extending from through holes of a flange of the trumpet arm. The trumpet arm 402 may be centered on an axis 401, such that the trumpet arm 402 may have a centerline coaxial with the axis 401. The axis 401 may be coaxial to the axis 301 of FIG. 3. The trumpet arm is an example of the first trumpet arm 302 and the second trumpet arm 304 of FIG. 3, and some elements of FIG. 3 may be excluded for brevity. The trumpet arm 402 may include through holes positioned along the perimeter of a planar face of the flange 408. Fasteners may extend from the through holes to enable the fasteners to couple the electric axle component described herein. For example, the trumpet arm 402 may include a first tension rod 404*a*, a second tension rod 404*b*, a third tension rod 404*c*, a fourth tension rod 404*d*, a fifth tension rod 404*e*, a sixth tension rod 404*f*, a seventh tension rod 404*g*, and an eighth tension rod 404*h* that extend from a respective through hole positioned along the perimeter of the flange 408. Each of the fasteners is in a tensile state via a nut to place an electric drive system, which may be an embodiment of the electric drive systems depicted above in FIGS. 2A-3, in compression.

Accordingly, the first tension rod 404*a*, the second tension rod 404*b*, the third tension rod 404*c*, the fourth tension rod 404*d*, the fifth tension rod 404*c*, the sixth tension rod 404*f*, the seventh tension rod 404*g*, and the eighth tension rod 404*h* may be in a tensile state via a first nut 406*a*, a second nut 406*b*, a third nut 406*c*, a fourth nut 406*d*, a fifth nut 406*c*, a sixth nut 406*f*, a seventh nut 406*g*, and an eighth nut (not shown), respectively. In this way, the tension rods are sufficiently stretched such that the tension rods are in a state of tensile stress, the stress does not go to zero, or there are no stress reversals during road load deflection cycles, which ensures that the nuts will not be loosened during the road load deflection cycles. The tension rods may be fully threaded or may be partially threaded at the ends.

Different embodiments of the trumpet arm 402 may include fewer or additional through holes, and as such, fewer or additional fasteners and nuts without departing from the scope of the present disclosure. Different embodiments of the trumpet arm may include a suitable number of through holes, fasteners, and nuts to ensure that the electric axle components are sufficiently compressed.

Figure 5:
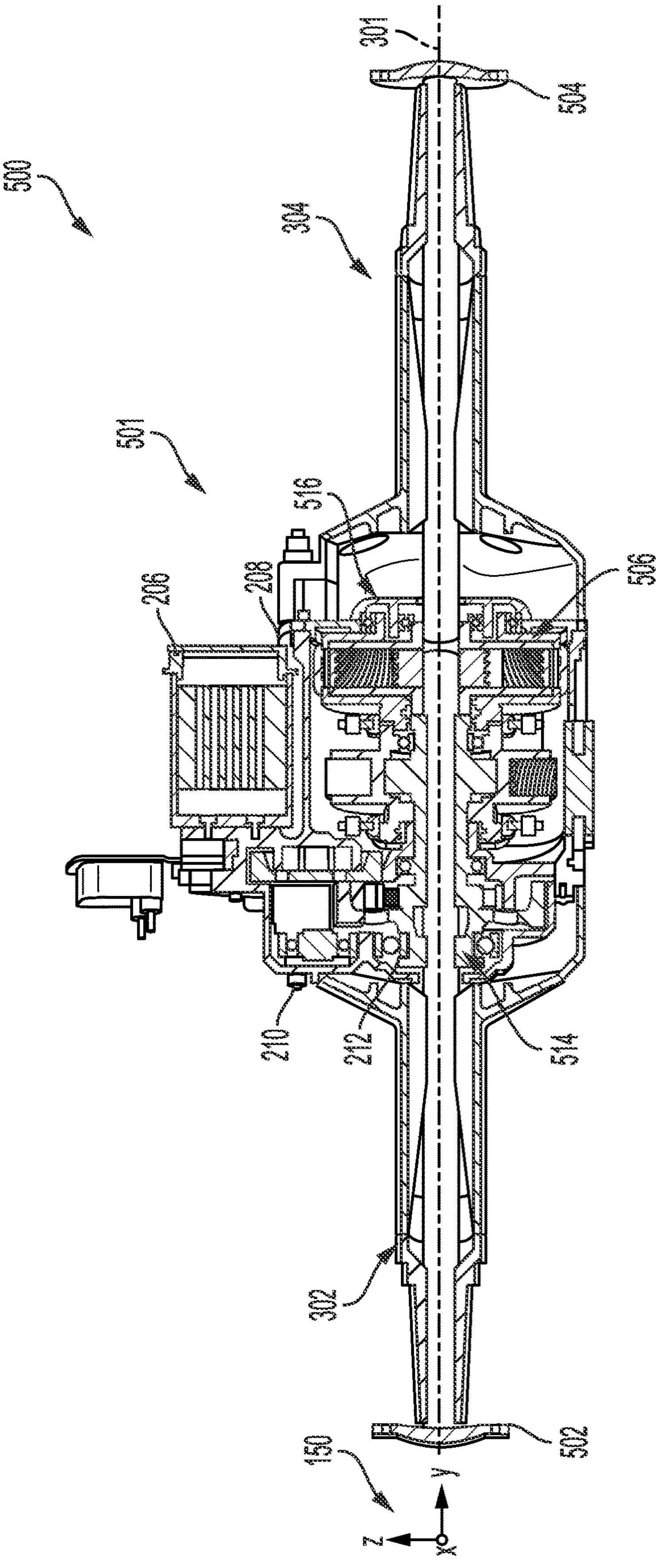
FIG. 5 shows a first cross section view of an electric drive system, according to the embodiments described herein.

FIG. 5 is a first cross section 500 of an electric drive system 501, which may be an embodiment of the electric drive systems described above in FIGS. 2A-3. As such, the electric drive system 501 may share at least some of the structural and functional features with the electric drives systems of FIGS. 2A-3 and redundant description of these overlapping features is omitted for concision, including the electric machine 206, the gearbox housing 208, and the first side cover 210, the first trumpet arm 302, and the second trumpet arm 304. The first cross section 500 enables partial visualization of a gearbox assembly 506 arranged in the gearbox housing 208 of a gearbox.

A first axle shaft 502 extends from the first trumpet arm 302 on one side of the electric drive system 501, through the first side cover 210, and partway through the gearbox housing 208. A second axle shaft 504 extends from the second trumpet arm 304 on another side of the electric drive system 501 to the gearbox housing 208. The first axle shaft 502 and the second axle shaft 504 are spaced apart by various components of the gearbox assembly 506. The first axle shaft 502 and the second axle shaft 504 may include a spline that is used to engage and couple to various components of the gearbox assembly 506. The first and second axle shafts 502, 504 may be centered about the axis 301, such that the first and second axle shafts 502, 504 may have their respective centerlines coaxial to the axis 301. The axis 301 may be a rotational axis for the first and second axle shafts 502, 504, such that the first and second axle shafts 504 may rotate/spin about the axis 301.

Turning to FIGS. 9A and 9B, a first side view 900 and a second side view 901 of the first side cover 210 is shown. The first side view 900 and the second side view 901 enable partial visualization of pockets on each side of the first side cover 210. The first side cover 210 includes a first pocket 902, a second pocket 904, and a third pocket 906. Each of the pockets has a circular cross section and the diameters of the pockets may be different. The diameter of the third pocket 906 is the largest to accommodate a large gear, and the diameter of the first pocket 902 is the smallest of the three circular cross sections to accommodate a small motor pinion. The third pocket 906 is positioned at the wider end and the first pocket 902 is positioned at the narrower end of the first side cover 210. In other embodiments, the pocket size and number of pockets may vary based upon bearing diameters, gear diameters and number of gears and shafts that are to be positioned in the first side cover 210 pockets.

The second pocket 904 is positioned between the first pocket 902 and the third pocket 906. The pockets position bearings that facilitate rotation of the various components of the gearbox assembly 506 and various components of the gearbox assembly. Each of the first pocket 902, the second pocket 904, and the third pocket 906 may position at least one bearing. As an example, the first pocket 902 may position a bearing that facilitates rotation of a third shaft (not shown) coupled to the electric machine 206, the second pocket 904 may position a bearing that facilitates rotation of a fourth shaft, and the third pocket 906 may position a bearing that facilitates rotation of a fifth shaft (not shown).

Figure 6:
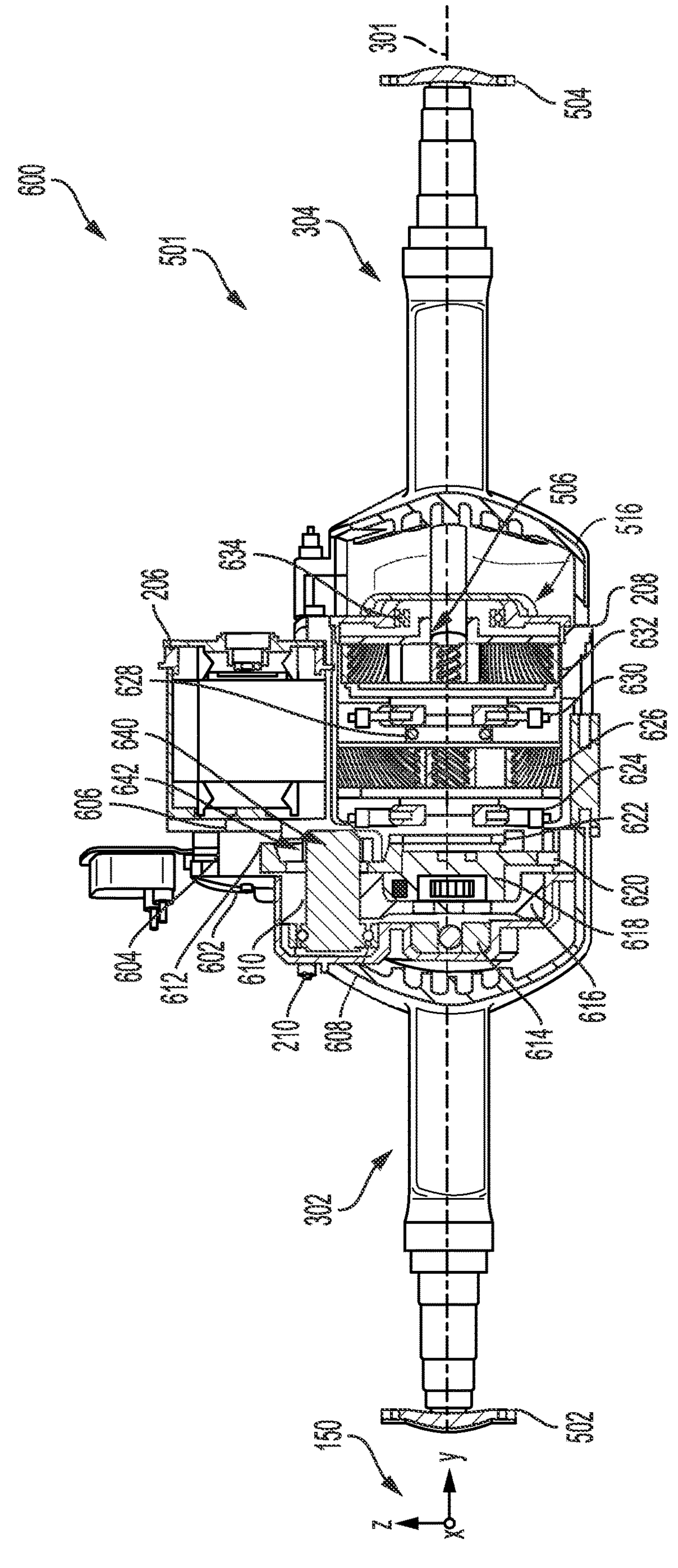
FIG. 6 shows a second cross section view of the electric drive system of FIG. 5, according to the embodiments described herein.

FIG. 6 is a second cross section 600 of an electric drive system 501, which may be an embodiment of the electric drive systems described above in FIGS. 2A-3. As such, the electric drive system 501 may share at least some of the structural and functional features with the electric drives systems of FIGS. 2A-3, and 5 and redundant descriptions of these overlapping features is omitted for concision, including the electric machine 206, the gearbox housing 208, and the first side cover 210, the first trumpet arm 302, and the second trumpet arm 304. The second cross section 600 enables partial visualization of a gearbox assembly 506 arranged in the gearbox housing 208.

The gearbox assembly 506 includes the third shaft (not shown) that is coupled to the electric machine 206. The third shaft is positioned in the first pocket 902 of the first side cover 210 and is coupled to a first bearing 602, a first gear 604, and a second bearing 606. The first bearing 602 is located at one end of the third shaft closest to the first trumpet arm 302 and the second bearing 606 is located at the opposite end of the third shaft closest to the electric machine 206. The first gear 604 is spaced between the first bearing 602 and the second bearing 606 on the third shaft.

The gearbox assembly 506 also includes the fourth shaft 640. The fourth shaft 640 is positioned in the second pocket 904 of the first side cover 210 and coupled to a third bearing 608, a second gear 610, a third gear 612, and a fourth bearing 642. The third bearing 608 is located at one end of the fourth shaft 640 closest to the first trumpet arm 302 and the fourth bearing 642 is located at the opposite end of the fourth shaft 640 closest to the electric machine 206. The second gear 610 is spaced between the third bearing 608 and the third gear 612 whereas the third gear 612 is spaced between the second gear 610 and the fourth bearing 642. The third gear 612 engages with the first gear 604 to transmit torque from the electric machine to the first gear 604, from the first gear 604 to the third gear 612, and from the third gear 612 to the fourth shaft 640.

The gearbox assembly 506 further includes a fifth shaft 514, shown in FIG. 5. The fifth shaft 514 is positioned in the third pocket 906 of the first side cover 210 and coupled to a fifth bearing 614, a fourth gear 616, a sixth bearing 618, a bearing plate 620, a seventh bearing 622, a first shift fork 624, a first planetary gear 626, an eighth bearing 628, a second shift fork 630, a second planetary gear 632, a ninth bearing 634, and a second side cover 516, and are coupled to the first axle shaft 502 and second axle shaft 504 within the second planetary gear 632. The fourth gear 616 is spaced between the fifth bearing 614 and the sixth bearing 618. The fourth gear 616 engages with the second gear 610 to transmit torque from the fourth shaft 640 to the second gear 610, from the second gear 610 to the fourth gear 616, and from the fourth gear 616 to the fifth shaft 514.

The sixth bearing 618 is spaced between the fourth gear 616 and the bearing plate 620. The bearing plate 620 is spaced between the sixth bearing 618 and the seventh bearing 622. The seventh bearing 622 is positioned between the bearing plate 620 and the first shift fork 624. The first shift fork 624 is spaced between the seventh bearing 622 and the first planetary gear 626. The first planetary gear 626 is spaced between the first shift fork 624 and the eighth bearing 628. The eighth bearing 628 is spaced between the first planetary gear 626 and the second shift fork 630. The second shift fork 630 is spaced between the eighth bearing 628 and the second planetary gear 632. The second planetary gear 632 is spaced between the second shift fork 630 and the ninth bearing 634. The ninth bearing 634 is positioned in the second side cover 516.

More specifically, the ninth bearing 634 may be positioned in a pocket (not shown) on an internal side of the second side cover. In other embodiments, the second side cover may include one or more pockets on the internal side of the second side cover and a seal for the second axle shaft. In further embodiments, the second side cover may also include couple holes positioned on a side of the second side cover to couple the second trumpet arm to the second side cover via fasteners. In this way, the second side cover may be coupled to the gearbox housing via fasteners extending through couple holes positioned on the side of the second side cover.

Movement of the first shift fork 624 via actuators may enable engagement of the first planetary gear 626 and movement of the second shift fork 630 via actuators may enable engagement of the second planetary gear 632. The first shift fork 624 and the second shift fork 630 may be rotational shift forks. It may be understood that the gearbox assembly 506 described herein is exemplary and may depart from the example provided above without departing from the scope of the present disclosure. As an example, the number of gears, type of gears, number of bearings, type of bearings may differ from the example provided above.

Figure 7:
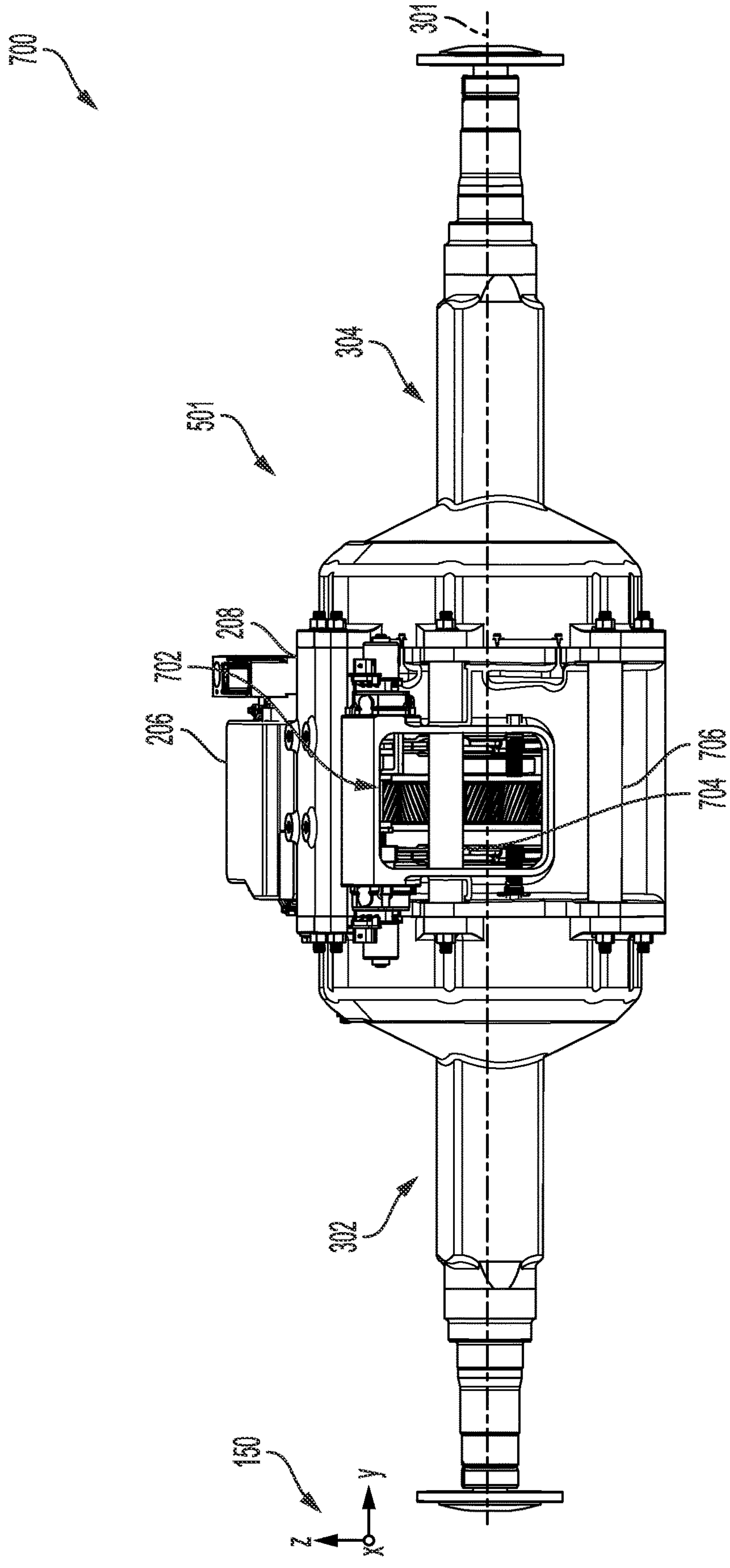
FIG. 7 shows a profile view of the electric drive system of FIG. 5.

FIG. 7 shows a profile view 700 of the electric drive system 501, which may be an embodiment of the electric drive systems described above in FIGS. 2A-6. As such, the electric drive system 501 may share at least some of the structural and functional features with the electric drives systems of FIGS. 2A-3 and redundant description of these overlapping features is omitted for concision, including the electric machine 206, the gearbox housing 208, the first trumpet arm 302, and the second trumpet arm 304.

For example, the electric drive system 501 includes the gearbox housing 208 comprising internal lateral ribs/webs and external lateral ribs/webs, compression tubes extending from one side to an opposite side of the gearbox housing, and couple holes positioned around a perimeter of the gearbox housing 208 on both sides of the gearbox housing. The electric drive system 501 also includes the first side cover 210 coupled to the gearbox housing 208 via fasteners extending through couple holes positioned on the side of the first side cover 210 at regions where a boss or junction is positioned on an interior side of the first side cover 210. The electric drive system 501 further includes the first trumpet arm 302 coupled to the first side cover 210 via fasteners that extend through couple holes positioned around a perimeter of a flange of the first trumpet arm 302, extend through couple holes of the first side cover 210, extend from the couple holes of the first side cover 210 through the couple holes of the gearbox housing 208 on one side, and extend through couple holes of the gearbox housing 208 on the other side of the gearbox housing 208 to through couple holes positioned around a perimeter of a flange of a second trumpet arm 304.

The profile view 700 enables partial visualization of a window 702 that enables access to the interior of the gearbox housing 208 and different types of compression tubes, which may be examples of the compression tubes depicted in FIG. 3. Access to the interior of the gearbox housing 208 via the window 702 allows the first shift fork 624, the second shift fork 630, and actuators that move the shift fork to engage gears (e.g. the planetary gears of FIG. 6) of the gearbox assembly 506 to be assembled.

The electric drive system 501 may include a first compression tube 704 and a second compression tube 706. As described above, compression tubes are used in place of internal and external lateral ribs/webs. By including compression tubes instead of external lateral ribs/webs, it is possible to have physical access to the window 702, and thus, the actuators, as desired since the compression tubes may be assembled after the actuation mechanism has been assembled. The compression tubes may be internal or external relative to the gearbox housing 208. As an example, the first compression tube 704 is internal relative to the gearbox housing 208. In contrast, the second compression tube 706 is external relative to the gearbox housing 208. In other examples, both the first compression tube 704 and the second compression tube 706 may be internal. In further examples, both the first compression tube 704 and the second compression tube 706 may be external.

The use of compression tubes may provide a plurality of advantages to electric drive systems that do not include compression tubes as components. For an example, integrating compression tubes into the electric drive system 501 may allow for compression tubes to be fabricated from a lighter weight material than the internal and external lateral webs/ribs, and thus, may have a smaller cross sectional area than the internal and external lateral web/ribs. Another example is that the compression tubes may be fabricated from a different alloy than the gearbox housing 208. Additionally, if one or more compression tubes are included in the electric drive system 501, the length of each compression tube may be different for assembly purposes and/or to reduce modal vibration. Further, a compression tube may be used as a connection, support and/or mount, or integrated with other compression tubes and/or be a part of a structure for a mounting bracket. In one example, an internal compression tube may be used to locate and support the shift fork mechanism within gearbox housing 208. In another example, if the two external lateral ribs/webs 322 shown on the top of gearbox housing 208 in FIG. 3 were replaced with two compression tubes, the two compression tubes could be integrated with a plate to form a mounting bracket to function as a "V" bracket, or IROS bracket suspension support.

Figure 8:
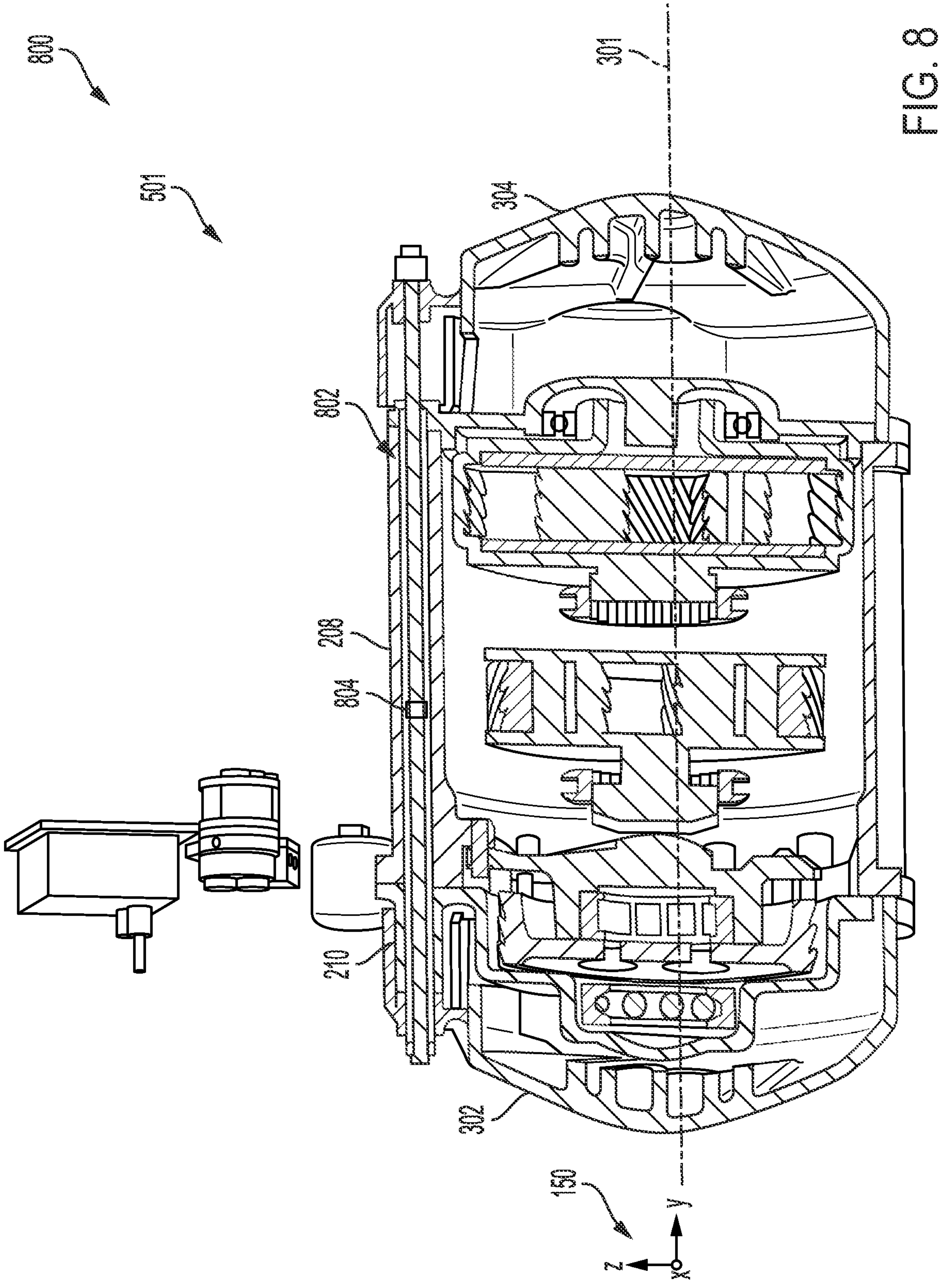
FIG. 8 shows a third cross section view of the electric drive system which includes a fastener with a dampening component.
Figure 9B:
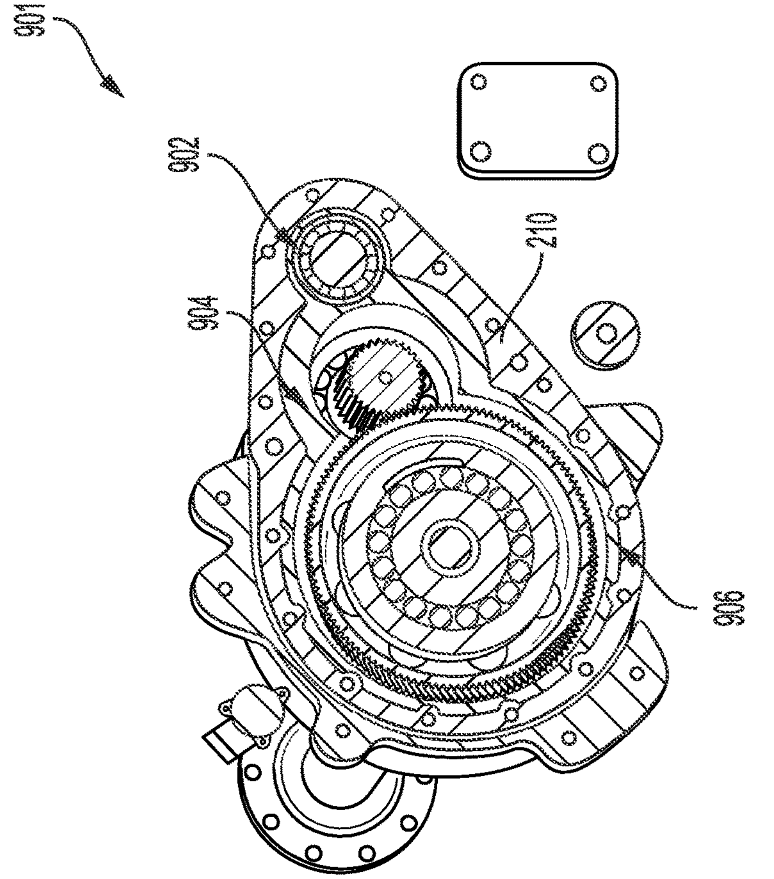
FIGS. 9A and 9B show a first side view and a second side view of a first side cover, according to the embodiments described herein.
Figure 9A:
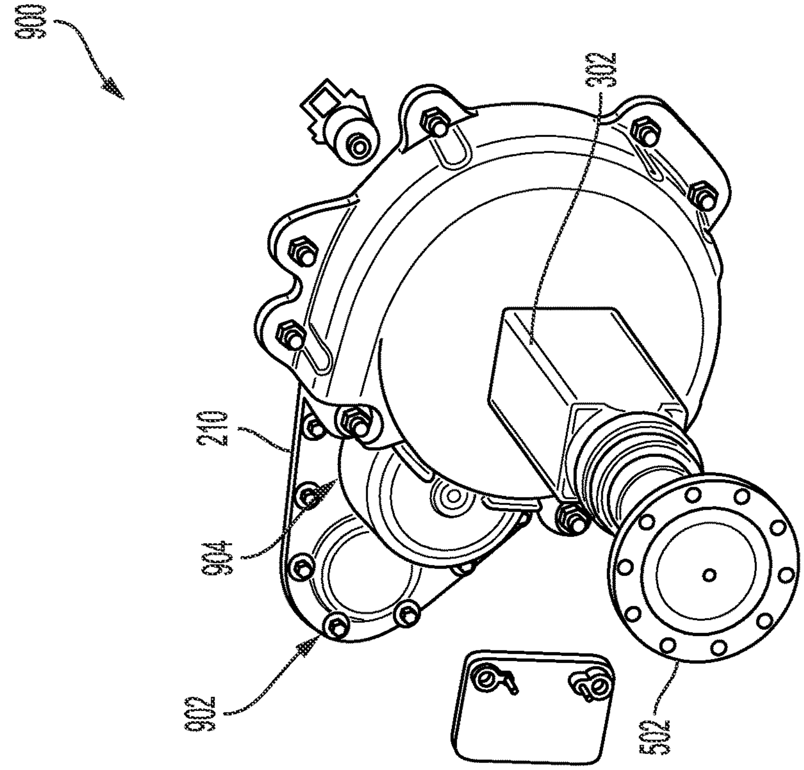

FIG. 8 is a third cross section 800 of an electric drive system 501, which may be an embodiment of the electric drive systems described above in FIGS. 2A-7. As such, the electric drive system 501 may share at least some of the structural and functional features with the electric drives systems of FIGS. 2A-7 and redundant description of these overlapping features is omitted for concision, including the electric machine 206, the gearbox housing 208, the first side cover 210, the first trumpet arm 302, and the second trumpet arm 304. A fastener 802 extends through the gearbox housing 208.

The fastener 802 may be considered a long, thin member that is under tension when torqued down by nuts, as described herein. Since the fastener 802 is under tension, it may have a strong, natural frequency and as such, deflections due to the road load may cause the fastener 802 to oscillate in an uncontrolled manner when a frequency overlap occurs. The fastener 802 may be configured to position a flexible element 804 along a length of the fastener 802 to prevent unwanted oscillation. In some examples, multiple flexible elements 804 may be positioned along the length of the fastener 802. The fastener 802 and the cylindrical tube wherein the fastener is extending through are both in contact with the flexible element to enable the flexible element to dampen the unwanted oscillations. For example, the flexible element 804 may be a bushing, grommet, or an O-ring that surrounds a machined groove on the length of the flexible element, or positioned along the length of the through hole within gearbox housing 208. As such, the fastener 802 may be configured to position the bushing, grommet, or the O-ring along the length of the fastener 802.

The technical effect of the electric axle having trumpet arms wherein the attachment location of the trumpet arms is isolated from the side walls of the side covers and side walls of the gearbox housing is that deflection of the side walls of the side covers and side walls of the gearbox housing from road load may be decreased due to the deflections being transferred from the trumpet arm to the gearbox housing to the other trumpet arm via the fasteners that extend through the side cover and gearbox housing. In this way, the magnitude of skew misalignment between the bearings that the respective side walls are supporting may be reduced, which increases bearing life, increases gear life, and decreases noise, vibration, and harshness.

The disclosure also provides support for an axle, comprising: a gearbox housing comprising lateral ribs/webs, compression tubes extending from one side to an opposite side of the gearbox housing, and couple holes positioned around a perimeter of the gearbox housing, a first side cover coupled to the gearbox housing via bolts and via fasteners extending through couple holes positioned on a side of the first side cover, a first trumpet arm coupled to the first side cover and the gearbox housing via fasteners extending through couple holes positioned around the perimeter of a flange of the first trumpet arm and the gearbox housing, an attachment location of the first trumpet arm being isolated from side walls of the gearbox housing and side walls of the first side cover, and a second trumpet arm coupled to the gearbox housing via fasteners extending through couple holes positioned around the perimeter of the flange of the second trumpet arm and the gearbox housing, an attachment location of the second trumpet arm being isolated from the side walls of the gearbox housing.

In a first example of the system, a second side cover is coupled to the gearbox housing via bolts, the second side cover being located between the gearbox housing and the second trumpet arm and the side walls of the second side cover being isolated from the second trumpet arm. In a second example of the system, optionally including the first example, lateral ribs/webs are located on a peripheral of the gearbox housing, the lateral ribs/webs comprising of either internal lateral ribs/webs, external lateral ribs/webs, or both. In a third example of the system, optionally including one or both of the first and second examples, compression tubes are located on a peripheral of the gearbox housing, the compression tubes being internal compression tubes, external compression tubes, or both internal compression tubes and external compression tubes.

In a fourth example of the system, optionally including one or more or each of the first through third examples, the fasteners are in a tensile state to couple the first trumpet arm to the first side cover and the gearbox housing, and to couple the second trumpet arm to the gearbox housing, thereby placing a center region of the gearbox housing in compression. In a fifth example of the system, optionally including one or more or each of the first through fourth examples, the fasteners are fully or partially threaded. In a sixth example of the system, optionally including one or more or each of the first through fifth examples, the fasteners are tension rods with nuts on each side, through bolts with a nut opposite the bolt head, or through bolts threaded into an opposing trumpet arm.

In a seventh example of the system, optionally including one or more or each of the first through sixth examples, the fasteners are bolts. In an eighth example of the system, optionally including one or more or each of the first through seventh examples, opposing couple holes of the gearbox housing may be co-linear or offset in the lateral ribs/webs. In a ninth example of the system, optionally including one or more or each of the first through eighth examples, a fastener is configured to position one or more bushings, grommets or O-rings along a length of the fastener to dampen vibrations of the fastener.

The disclosure also provides support for a gearbox, comprising: a gearbox assembly comprising bearings to facilitate rotation of a first axle shaft, a second axle shaft, a third shaft, a fourth shaft and a fifth shaft, shift forks, and actuators that move a shift fork to engage gears of the gearbox assembly, a gearbox housing that encloses the gearbox assembly and comprises internal lateral ribs/webs, external lateral ribs/webs, internal compression tubes, external compression tubes, a window for accessing the shift forks and actuators of the gearbox assembly, and couple holes positioned around a perimeter of the gearbox housing to couple a first trumpet arm to the gearbox housing via fasteners, the couple holes being positioned on the perimeter of each side of the gearbox housing, a first side cover comprising pockets on an internal side of the first side cover, a seal for the first axle shaft, and couple holes positioned on a side of the first side cover to couple the first trumpet arm to the first side cover via fasteners, and a second side cover comprising one or more pockets on an internal side of the second side cover, a seal for the second axle shaft, and bolts to couple the second side cover to the gearbox.

In a first example of the system, the internal lateral ribs/webs, the external lateral ribs/webs, internal compression tubes, external compression tubes, the first trumpet arm, and the second trumpet arm are parallel to an axle axis. In a second example of the system, optionally including the first example, for opposing couple holes that position bolts, the internal lateral ribs/webs, the external lateral ribs/webs, and compression tubes are drilled and tapped such that a full drill shoulder depth of a drilled lateral rib/web is equal to or greater than five times the diameter of a drilled lateral rib/web hole, and wherein the internal lateral ribs/webs and the external lateral ribs/webs are threaded near a mid-region of the internal lateral ribs/webs and external lateral ribs/webs. In a third example of the system, optionally including one or both of the first and second examples, for opposing couple holes that position tension rods and through bolts, the internal lateral ribs/webs, external lateral ribs/webs, have through holes extending from one side of the gearbox to another side of the gearbox which are not threaded in the mid-region of the internal lateral ribs/webs, external lateral ribs/webs, and compression tubes.

In a fourth example of the system, optionally including one or more or each of the first through third examples, the first side cover includes a first pocket that positions the third shaft, a second pocket that positions the fourth shaft, and a third pocket that positions the fifth shaft and the second pocket is spaced between the first pocket and the third pocket. In a fifth example of the system, optionally including one or more or each of the first through fourth examples, the couple holes positioned on a side of the first side cover are positioned at locations where the first side cover is able to be supported by a boss or junction on an interior side of the first side cover. In a sixth example of the system, optionally including one or more or each of the first through fifth examples, the boss or junction on the interior side of the first side cover is integral with the first side cover, an internal lateral rib/web of the gearbox housing, or an external lateral rib/web of the gearbox housing. In a seventh example of the system, optionally including one or more or each of the first through sixth examples, the internal compression tubes and the external compression tubes are used as a connection, support, mount or mounting bracket for additional componentry, both external and internal to the gearbox housing.

The disclosure also provides support for an electric axle, comprising: an inverter, an electric machine, a gearbox housing comprising internal lateral ribs/webs and external lateral ribs/webs, compression tubes extending from one side to an opposite side of the gearbox housing, and couple holes positioned around a perimeter of the gearbox housing on both sides of the gearbox housing, a first side cover coupled to the gearbox housing via fasteners extending through couple holes positioned on a side of the first side cover at regions where a boss or junction is positioned on an interior side of a side cover, and a first trumpet arm coupled to the first side cover via fasteners that extend through couple holes positioned around the perimeter of a flange of the first trumpet arm, that extend through couple holes of the first side cover, that extend through couple holes of the gearbox housing on one side to through couple holes of the gearbox housing on another, to through couple holes positioned around the perimeter of the flange of a second trumpet arm, and a second side cover coupled to the gearbox housing via fasteners. In a first example of the system, the boss or junction between the first side cover and the gearbox housing is sealed with an O-ring, gasket, sealant, compression washer, a combination, and the like.

FIGS. 1-9B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Features described as axial may be approximately parallel with an axis referenced unless otherwise specified. Features described as counter-axial may be approximately perpendicular to the axis referenced unless otherwise specified. Features described as radial may be circumferentially around or extend in a radially outward from an axis, such as the axis referenced, or a component or feature described prior as being radial to a referenced axis, unless otherwise specified.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An axle, comprising:

- a gearbox housing comprising lateral ribs/webs, compression tubes extending from one side to an opposite side of the gearbox housing, and first couple holes positioned around a perimeter of the gearbox housing;
- a first side cover coupled to the gearbox housing via bolts and via first fasteners extending through second couple holes positioned on a side of the first side cover;
- a first trumpet arm coupled to the first side cover and the gearbox housing via second fasteners extending through third couple holes positioned around the perimeter of a first flange of the first trumpet arm and at least one of the first couple holes of the gearbox housing, and via third fasteners extending through fourth couple holes of the first flange and a different at least one of the first couple holes of the gearbox housing, where the third fasteners do not extend through the first side cover; and
- a second trumpet arm coupled to the gearbox housing via the second and third fasteners extending through fifth couple holes positioned around the perimeter of a second flange of the second trumpet arm and the gearbox housing, where the first trumpet arm, the second trumpet arm, the first side cover, and the gearbox housing are separate components.

2. The axle of claim 1, wherein a second side cover is coupled to the gearbox housing via bolts, the second side cover being located between the gearbox housing and the second trumpet arm.

3. The axle of claim 1, wherein the lateral ribs/webs are located on a peripheral of the gearbox housing, the lateral ribs/webs comprising of either internal lateral ribs/webs, external lateral ribs/webs, or both.

4. The axle of claim 1, wherein the compression tubes are located on a peripheral of the gearbox housing, the compression tubes being internal compression tubes, external compression tubes, or both internal compression tubes and external compression tubes.

5. The axle of claim 1, wherein the second fasteners are in a tensile state to couple the first trumpet arm to the first side cover and the gearbox housing, and to couple the second trumpet arm to the gearbox housing, thereby placing a center region of the gearbox housing in compression.

6. The axle of claim 5, wherein the second fasteners are fully or partially threaded.

7. The axle of claim 6, wherein the second fasteners are tension rods with nuts on each side, through bolts with a nut opposite the bolt head, or through bolts threaded into an opposing trumpet arm.

8. The axle of claim 6, wherein the second fasteners are bolts.

9. The axle of claim 5, wherein opposing first couple holes of the gearbox housing are co-linear or offset in the lateral ribs/webs.

10. The axle of claim 1, wherein one or more bushings, grommets or O-rings are positioned along a length of at least one fastener of the second and third fasteners to dampen vibrations of the at least one fastener.

11. A gearbox, comprising:

- a gearbox assembly comprising bearings to facilitate rotation of a first axle shaft, a second axle shaft, a third shaft, a fourth shaft and a fifth shaft, shift forks, and actuators that move a shift fork to engage gears of the gearbox assembly;
- a gearbox housing that encloses the gearbox assembly and comprises internal lateral ribs/webs, external lateral ribs/webs, internal compression tubes, external compression tubes, a window for accessing the shift forks and actuators of the gearbox assembly, and first couple holes positioned around a perimeter of the gearbox housing to couple a first trumpet arm to the gearbox housing via fasteners, the first couple holes being positioned on the perimeter of each side of the gearbox housing;
- a first side cover comprising pockets on a first internal side of the first side cover, a seal for the first axle shaft, and second couple holes positioned on a side of the first side cover to couple the first trumpet arm to the first side cover via the fasteners; and a second side cover comprising one or more pockets on a second internal side of the second side cover, a seal for the second axle shaft, and bolts to couple the second side cover to the gearbox.

12. The gearbox of claim 11, wherein the internal lateral ribs/webs, the external lateral ribs/webs, the internal compression tubes, the external compression tubes, the first trumpet arm, and a second trumpet arm are parallel to an axle axis.

13. The gearbox of claim 11, wherein the internal lateral ribs/webs, the external lateral ribs/webs, the internal compression tubes and the external compression tubes are drilled and tapped such that a full drill shoulder depth of a drilled lateral rib/web is equal to or greater than five times a diameter of a drilled lateral rib/web hole, and wherein the internal lateral ribs/webs and the external lateral ribs/webs are threaded near a mid-region of the internal lateral ribs/webs and external lateral ribs/webs.

14. The gearbox of claim 11, wherein the internal lateral ribs/webs, the external lateral ribs/webs, the internal compression tubes, and the external compression tubes have through holes extending from one side of the gearbox to another side of the gearbox which are not threaded in the mid-region of the internal lateral ribs/webs, external lateral ribs/webs, the internal compression tubes, and the external compression tubes.

15. The gearbox of claim 11, wherein the first side cover includes a first pocket that positions the third shaft, a second pocket that positions the fourth shaft, and a third pocket that positions the fifth shaft and the second pocket is spaced between the first pocket and the third pocket.

16. The gearbox of claim 11, wherein the second couple holes positioned on the side of the first side cover are positioned at locations where the first side cover is able to be supported by a boss or junction on the first internal side of the first side cover.

17. The gearbox of claim 16, wherein the boss or junction on the interior side of the first side cover is integral with the first side cover, one of the internal lateral rib/webs of the gearbox housing, or one of the external lateral rib/webs of the gearbox housing.

18. The gearbox of claim 11, wherein the internal compression tubes and the external compression tubes are used as a connection, support, mount or mounting bracket for additional componentry, both external and internal to the gearbox housing.

19. An electric axle, comprising:

an inverter;

an electric machine;

a gearbox housing comprising internal lateral ribs/webs and external lateral ribs/webs, compression tubes extending from one side to an opposite side of the gearbox housing, and first couple holes positioned around a perimeter of the gearbox housing on both sides of the gearbox housing;

a first side cover coupled to the gearbox housing via fasteners extending through second couple holes positioned on a side of the first side cover at regions where a boss or junction is positioned on an interior side of the first side cover; and a first trumpet arm coupled to the first side cover via the fasteners which further extend through third couple holes positioned around a perimeter of a first flange of the first trumpet arm, through the first couple holes of the gearbox housing, and through fourth couple holes positioned around a perimeter of a second flange of a second trumpet arm; and a second side cover coupled to the gearbox housing via the fasteners.

20. The electric axle of claim 19, wherein the boss or junction between the first side cover and the gearbox housing is sealed with an O-ring, gasket, sealant, compression washer, or a combination thereof.

* * * * *